(12) United States Patent
Pettersson (10) Patent No.: US 8,640,562 B2
(45) Date of Patent: Feb. 4, 2014

(54) LINEAR ACTUATOR

(75) Inventor: Hans Pettersson, Habo (SE)

(73) Assignee: KIH-Utveckling AB, Jonkoping (SE)

( * ) Notice: Subject to any disclaimer, the term of this patent is extended or adjusted under 35 U.S.C. 154(b) by 748 days.

(21) Appl. No.: 12/870,023

(22) Filed: Aug. 27, 2010

(65) Prior Publication Data

US 2011/0067511 A1   Mar. 24, 2011

(30) Foreign Application Priority Data

Aug. 31, 2009   (EP) ..................................... 09169023

(51) Int. Cl.
*F16H 27/02*   (2006.01)

(52) U.S. Cl.
USPC .................................... 74/89.37; 108/147.19

(58) Field of Classification Search
USPC .............. 74/37, 28; 200/47; 108/144.11, 147, 108/147.19
See application file for complete search history.

(56) References Cited

U.S. PATENT DOCUMENTS

| | | | | | |
|---|---|---|---|---|---|
| 1,686,851 | A | * | 10/1928 | Gorman | 318/266 |
| 2,265,022 | A | * | 12/1941 | Bendz | 187/394 |
| 2,854,113 | A | * | 9/1958 | Hallden | 192/141 |
| 2,945,925 | A | * | 7/1960 | Gessell | 200/47 |
| 2,951,920 | A | * | 9/1960 | Miller | 200/47 |
| 2,964,601 | A | * | 12/1960 | Stockwell | 200/47 |
| 3,474,317 | A | * | 10/1969 | Delaney | 318/266 |
| 3,764,875 | A | * | 10/1973 | Harris | 318/266 |
| 3,825,809 | A | * | 7/1974 | Gatland et al. | 318/282 |
| 3,996,697 | A | * | 12/1976 | Bailey et al. | 49/28 |
| 4,010,408 | A | * | 3/1977 | Bailey | 318/266 |
| 4,155,237 | A | * | 5/1979 | Jungesjo | 72/88 |
| 4,247,744 | A | * | 1/1981 | Birkle | 200/47 |
| 4,712,441 | A | | 12/1987 | Abraham | |
| 4,973,893 | A | * | 11/1990 | Secretan | 318/280 |
| 5,299,678 | A | * | 4/1994 | Chang et al. | 192/141 |
| 7,161,100 | B1 | * | 1/2007 | Hsieh | 200/47 |
| 7,857,033 | B2 | * | 12/2010 | Malausa | 160/310 |

FOREIGN PATENT DOCUMENTS

| | | |
|---|---|---|
| FR | 1 446 946 A | 11/1966 |
| GB | 1 593 570 A | 7/1981 |
| JP | 2003-322233 A | 11/2003 |
| WO | 2009/039853 A2 | 4/2009 |
| WO | 2009/086831 A1 | 7/2009 |

OTHER PUBLICATIONS

European Search Report: EP 09 16 9023.

* cited by examiner

*Primary Examiner* — Troy Chambers
*Assistant Examiner* — Valentin Craciun
(74) *Attorney, Agent, or Firm* — Ladas & Parry LLP (57) ABSTRACT

A linear actuator is presented, having a drive shaft, a transmission connected to the drive shaft, and a spindle connected to the transmission. The drive shaft, the transmission and the spindle are connected in such a way that a rotational movement of the drive shaft is transmitted to the spindle via the transmission. The linear actuator also has a spindle nut arranged rotationally prevented onto the spindle, and an end stop detection unit for detecting that the spindle nut reaches an end position on the spindle. The end stop detection unit comprises an end stop detection shaft connected to the transmission in such a way that a rotational movement of the spindle is transmitted to the end stop detection shaft such that a rotational movement of the spindle is reflected by a rotational movement of the end stop detection shaft.

10 Claims, 6 Drawing Sheets

LINEAR ACTUATOR

TECHNICAL FIELD

The present disclosure relates to linear actuators, and especially to end-stop detection units of linear actuators.

BACKGROUND

Linear actuators are used for raising and lowering e.g. a piece of furniture, e.g. the height of a table top. A linear actuator may comprise a drive shaft, a transmission connected to the drive shaft and a spindle connected to the transmission, wherein the drive shaft, the transmission and the spindle are connected in such a way that a rotational movement of the drive shaft is transmitted to the spindle via the transmission. The linear actuator further comprises a spindle nut arranged rotationally prevented onto the spindle such that the spindle nut moves along the spindle when the spindle is rotated.

In such arrangements there is a need to stop the raising movement when a predetermined uppermost position is reached, and to stop the lowering movement when a predetermined lowermost position is reached. This is to avoid that the linear actuator is driven into its physical end positions, which may result in damages to the linear actuator.

There are many kinds of prior art end stop detection systems. WO2009039853 shows a system for detecting that the spindle nut reaches its predetermined end positions. This system uses capacitive detectors connected to end stop switches arranged in the leg, in parallel with the spindle. The system is used to detect when the spindle nut reaches the predetermined end position and to prevent further movement in that direction when the predetermined end position is reached.

Such a system requires a lot of the limited space available in the legs. Further, the system is rather complicated and expensive.

Consequently, there is a need for an alternative, cost-efficient and secure way of detecting that a spindle nut of a linear actuator reaches a desired end position.

SUMMARY

It is an object of the present invention to provide a linear actuator that in a cost-efficient and secure way can detect that a spindle nut of the linear actuator reaches a desired end positions along the spindle.

This is achieved with a linear actuator according to the appended independent claim. Embodiments of the invention are presented in the dependent claims, as well as in the following description and drawings.

According to the present invention a linear actuator is provided, comprising a drive shaft, a transmission connected to the drive shaft, a spindle connected to the transmission, wherein the drive shaft, the transmission and the spindle being connected in such a way that a rotational movement of the drive shaft is transmitted to the spindle via the transmission. The linear actuator further comprises a spindle nut arranged rotationally prevented onto the spindle such that the spindle nut moves along the spindle when the spindle is rotated, and an end stop detection unit for detecting that the spindle nut reaches an end position on the spindle. The linear actuator is characterized in that the end stop detection unit comprises an end stop detection shaft connected to the transmission in such a way that a rotational movement of the spindle is transmitted to the end stop detection shaft such that the rotational movement of the spindle is reflected by the rotational movement of the end stop detection shaft.

Thereby, the end stop detection unit does not have to be in direct contact with the spindle, meaning that the end stop detection unit can be placed outside the leg, where there is more space available for the end stop detection unit. Also, it will be easy to mount the end stop detection unit to the linear actuator when it is connected to the linear actuator via the transmission. Also, the end stop detection unit can be cost-efficiently realized.

In one embodiment the end stop detection unit further comprises an end stop nut arranged rotationally prevented onto the end stop detection shaft such that the end stop nut moves along the end stop detection shaft when the end stop detection shaft is rotated.

By providing a nut on the end stop detection shaft, the position of the spindle nut on the spindle will be reflected by the position of the end stop nut on the end stop shaft. This may be used for the end stop detection of the linear actuator.

In another embodiment the end stop detection unit further comprises two disconnecting switches arranged at different positions along the end stop detection shaft, each position representing a desired end position of the spindle nut along the spindle.

The disconnecting switches may be activated by the end stop nut, moving along the end stop detection shaft. When the spindle nut reaches an end stop position along the spindle, the end stop nut reaches a corresponding position along the end stop detection shaft. In the corresponding position, the end stop nut activates one of the disconnecting switches, which may provide a stop signal to stop the rotational movement of the drive shaft, resulting in that the spindle nut stops at the end position along the spindle. The disconnecting switches may be micro switches.

In a further embodiment at least a first of the disconnecting switches is moveably arranged along the end stop detection shaft.

By arranging a first disconnecting switch to be moveable along the end stop detection shaft, one of the end positions for the linear actuator may be adjusted. If the first disconnecting switch is moved, the position wherein the end stop nut activates the first disconnecting switch is changed and consequently, the end position of the spindle nut along the spindle is changed. For instance, this end position may be the maximum height end position for the linear actuator, which may be adjusted to be a suitable maximum height for a table top for a certain user or to suit standards in different countries.

In a further embodiment the first disconnecting switch may be arranged rotationally prevented onto a switch positioning shaft. When the switch positioning shaft is rotated, the first disconnecting switch may move along the switch positioning shaft. The switch positioning shaft may also in one end have a notch for changing the position of the first disconnecting switch.

In this way the position of the first disconnecting switch, and the end position of the spindle nut along the spindle, may easily be changed since the notch may be shaped to fit a screw driver or the like. The position of the disconnecting switch may then be changed by turning the switch positioning shaft with a screw driver. This may control the maximum height that the leg of the linear actuator may be extended to.

In one embodiment, a second disconnecting switch is stationary arranged at a fixed position along the end stop detection shaft.

It is more cost-effective to arrange a disconnecting switch at a fixed position along the end stop detection shaft. For controlling the length of stroke of the linear actuator, it may be enough that one of the end positions is adjustable. The second disconnecting switch may be representing the set minimum height of the linear actuator. This minimum height may be set during manufacture of the linear actuator. Before the end stop detection unit is attached to the transmission, the end stop nut may be moved to a position along the end stop detection shaft representing the minimum height end position, and at the same time, the spindle nut is provided at the set minimum height end position along the spindle.

In one embodiment the spindle has a substantially vertical extension and the drive shaft has a substantially horizontal extension, and wherein the end stop detection shaft lies in substantially the same horizontal plane as the drive shaft.

Thereby, it is possible to place the end stop detection unit on top of the leg, below a subsequently arranged table top. There is more space available on top of the leg than inside the leg. It is also easier to mount an end stop detection unit on top of the leg, and may not disturb other parts of the linear actuator.

In one embodiment the transmission comprises a first gear wheel for receiving the drive shaft, a second gear wheel for receiving the end stop detection shaft and a third gear wheel for receiving the spindle, wherein the first gear wheel and the second gear wheel each engages the third gear wheel.

In a further embodiment the first gear wheel and the second gear wheel each has a substantially horizontal rotational axis and the third gear wheel has a substantially vertical rotational axis.

By providing the first gear wheel that engages the third gear wheel, the rotational movement of the drive shaft with a horizontal rotational axis may be transmitted to a rotational movement in the spindle with a vertical rotational axis. Additionally, the horizontal rotational movement of the drive shaft may be carried on to the end stop detection shaft via the three gear wheels.

In one embodiment the first gear wheel and the second gear wheel each engages the third gear wheel in such a manner that if the third gear wheel is rotated one revolution, the first gear wheel and the second gear wheel each is rotated two revolutions.

Thereby, the first and the second gear wheel may have smaller dimensions and the transmission may be made flatter and consequently take less space under a subsequently arranged table top attached to the linear actuator.

The spindle and the end stop detection shaft may in one embodiment be threaded.

In a further embodiment the spindle has a thread pitch that is at least 2 times the thread pitch of the end stop detection shaft, preferably at least 5 times, more preferably at least 10 times and most preferably at least 20 times the thread pitch of the end stop detection shaft.

With a thread pitch of the spindle that is at least 20 times the thread pitch of the end stop detection shaft, the end stop detection shaft may be made substantially shorter than the spindle, and thereby take less space and be more cost-effective.

BRIEF DESCRIPTION OF THE DRAWINGS

The invention will in the following be described in more detail with reference to the enclosed drawings, wherein.

DESCRIPTION OF EMBODIMENTS

The present invention will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like numbers refer to like elements.

Figure 1:
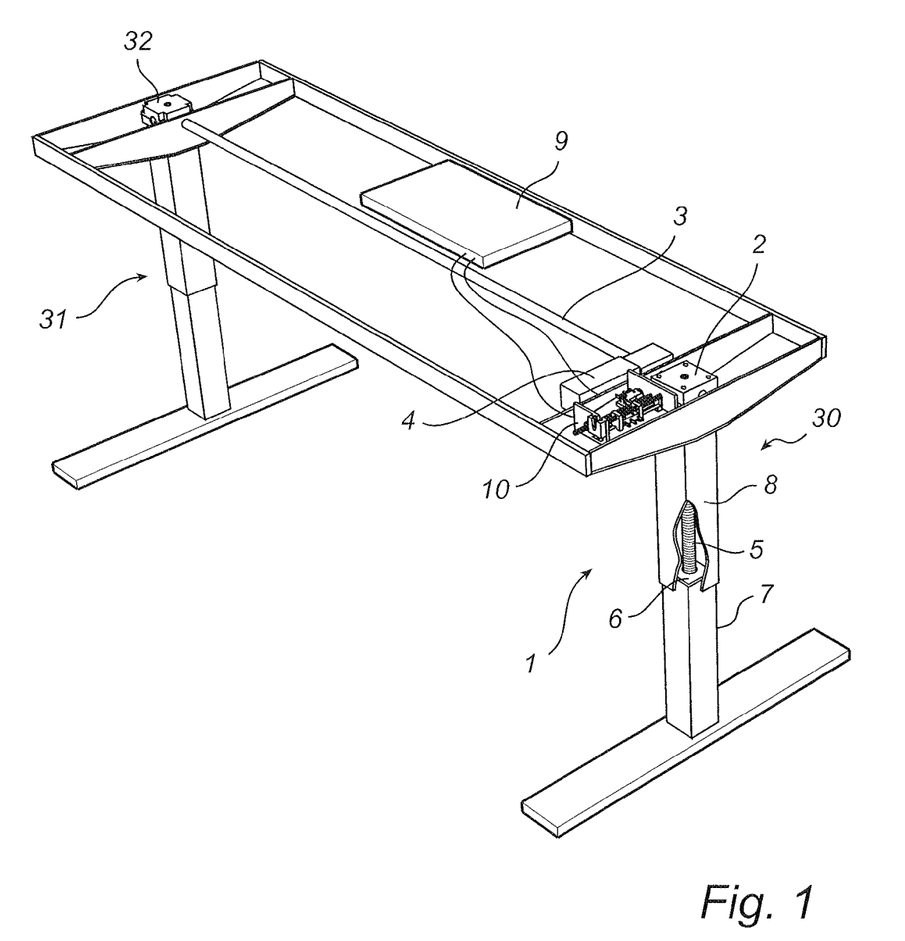
FIG. 1 is a schematic perspective view of a linear actuator according to the invention arranged to a table frame.

FIG. 1 describes a linear actuator 1 according to the invention having a leg 30 that elongates along its longitudinal axis. The linear actuator 1 comprises a transmission 2 to which is connected a drive shaft 3, a spindle 5 and an end stop detection unit 10. The drive shaft 3 is rotated by a motor 4. The motor 4 is controlled by a control unit 9. The spindle 5 is rotated by the drive shaft 3 through gears in the transmission 2. The transmission 2 is provided as a conical angle gear. When the spindle 5 rotates, it moves along its longitudinal axis relative to a spindle nut 6 providing an extension of the linear actuator 1. The spindle 5 is provided with outer threads, and the spindle nut 6 is provided with corresponding inner threads.

The linear actuator 1 comprises, in a leg 30, an inner tube 7 and an outer tube 8 arranged for telescopic movement relative to each other during extension and contraction of the linear actuator 1. The inner tube 7 is in one end attached to the spindle nut 6, and in another end faces the floor. The outer tube 8 is coupled to the spindle 5 via a bearing. When the spindle 5 rotates, it moves relative to the spindle nut 6 and a telescopic movement between the inner tube 7 and the outer tube 8 takes place. The inner tube 7 and the spindle nut 6 stay relatively still in relation to the floor during the telescopic movement. Alternatively, more than two tubes may be used in the leg 30 of the linear actuator 1.

The end stop detection unit 10 is connected to the transmission 2 in substantially the same horizontal plane as the drive shaft 3. The end stop detection unit 10 is arranged to reflect the movement of the spindle 5 relative to the spindle nut 6. The horizontal plane is provided on the top of the leg 30 in the linear actuator 1.

By the horizontal plane it is meant the plane in which the transmission 2, the end stop detection unit 10 and the drive shaft 3 lies, which is substantially perpendicular to the vertical plane in which the spindle 5 moves and the linear actuator 1 elongates, i.e. the longitudinal axis of the spindle.

Figure 3:
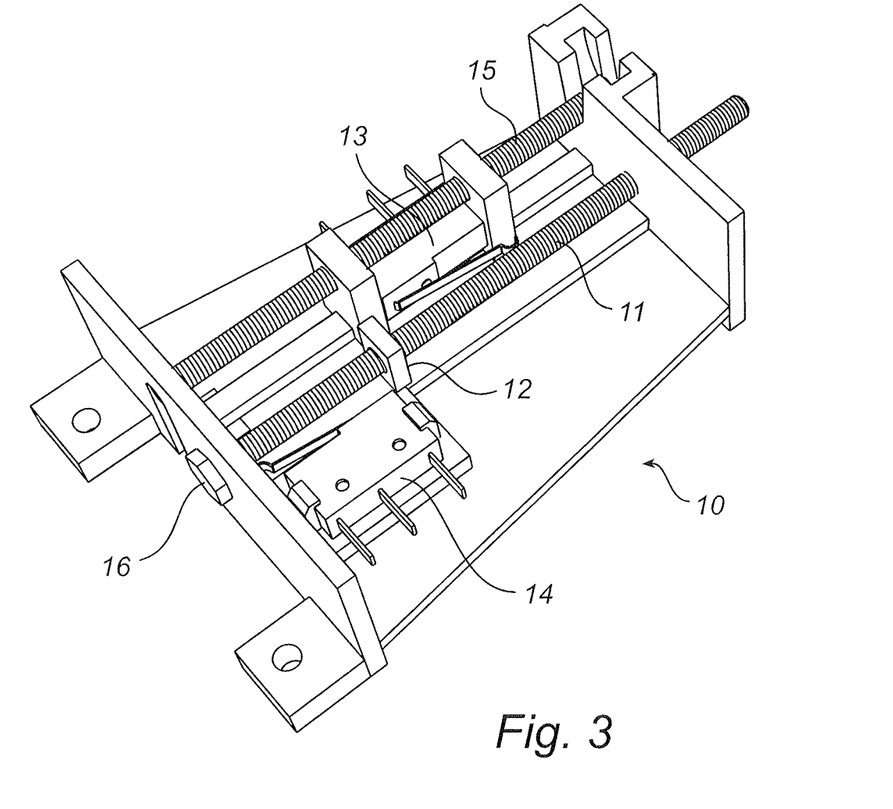
FIG. 3 is a schematic perspective view of an end stop detection unit according to the invention.

The end stop detection unit 10 comprises, as described in FIG. 3, an end stop detection shaft 11 which provides the connection to the transmission 2. Onto the end stop detection shaft 11 is an end stop nut 12 arranged. The end stop nut 12 is arranged to reflect, along the end stop detection shaft 11, the position of the spindle nut 6 along the spindle 5.

Figure 2A:
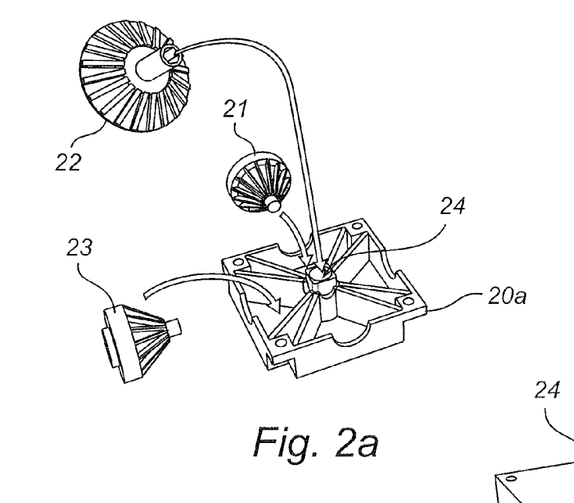
FIG. 2a is an exploded view of a transmission according to the invention.
Figure 2B:
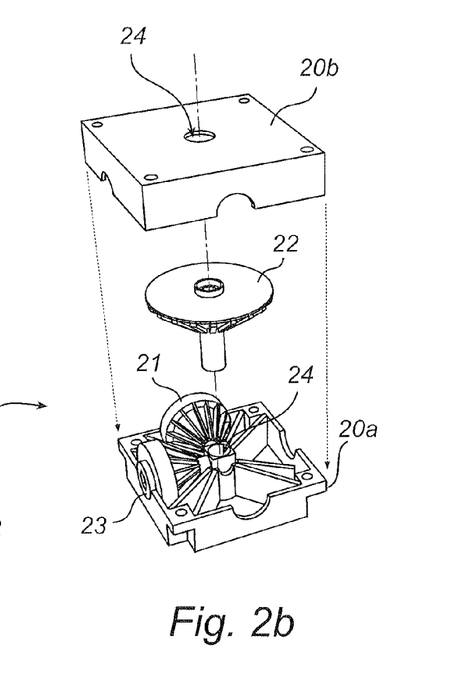
FIG. 2b is an exploded view of a transmission according to the invention.
Figure 2C:
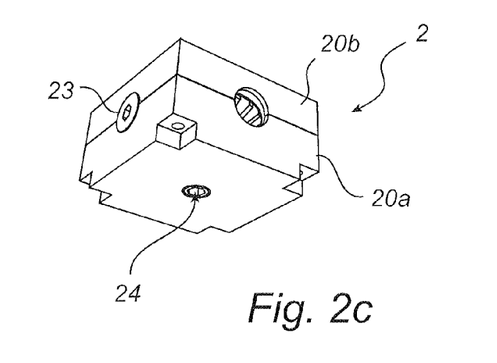
FIG. 2c is a perspective view from below of a transmission according to the invention.

Turning now to the transmission 2: As described in FIG. 2, when the drive shaft 3 rotates, it rotates a first side gear 21 arranged inside a transmission housing 20a, 20b with a rotational axis in the horizontal plane. The first side gear 21 engages a crown gear 22 arranged with a vertical rotational axis in the transmission housing 20a, 20b. The crown gear 22 is attached to the spindle 5, providing a transmission of the rotation of the drive shaft 3 to the spindle 5. Inside the transmission housing 20a, 20b is further arranged a second side gear 23. The second side gear 23 is attached to the end stop detection shaft 11 in the end stop detection unit 10. The second side gear 23 engages the crown gear 22 in the transmission housing 20a, 20b. A transmission of the rotational movement of the drive shaft 3 is provided to both the spindle 5 and the end stop detection shaft 11 via the gears 21, 22, 23 in the transmission 2. It results in a rotational movement of the end stop detection shaft 11 that reflects the rotational movement of the spindle 5.

The first side gear 21 is provided with a hole for receiving the drive shaft 3. The hole has an angular shape, preferably a hexagonal shape, to receive an end piece of the drive shaft 3 that has a corresponding shape. In the same way is the second side gear 23 shaped for receiving an end piece 16 of the end stop detection shaft 11. Also, the crown gear 22 has a hole for receiving the spindle 5, and the end of the spindle 5 is shaped to fit into the hole. The hole of the crown gear 22 and the end of the spindle 5 may be hexagonally shaped.

The first 21 and the second 23 side gears engage the crown gear 22 in such a way that when the side gears 21, 23 rotates two revolutions, the crown gear 22 rotates one revolution, i.e. there is a transmission ratio from the drive shaft 3 to the spindle 5 of 2:1. With this design, the side gears 21, 23 can be made smaller than if a transmission ratio of 1:1 would have been used, hence, the transmission housing 20a, 20b can be made flatter which saves space in the actuator construction. Between the drive shaft 3 and the end stop detection shaft 11, via the first side gear 21, the crown gear 22 and the second side gear 23, the transmission ratio is 1:1.

Figure 4A:
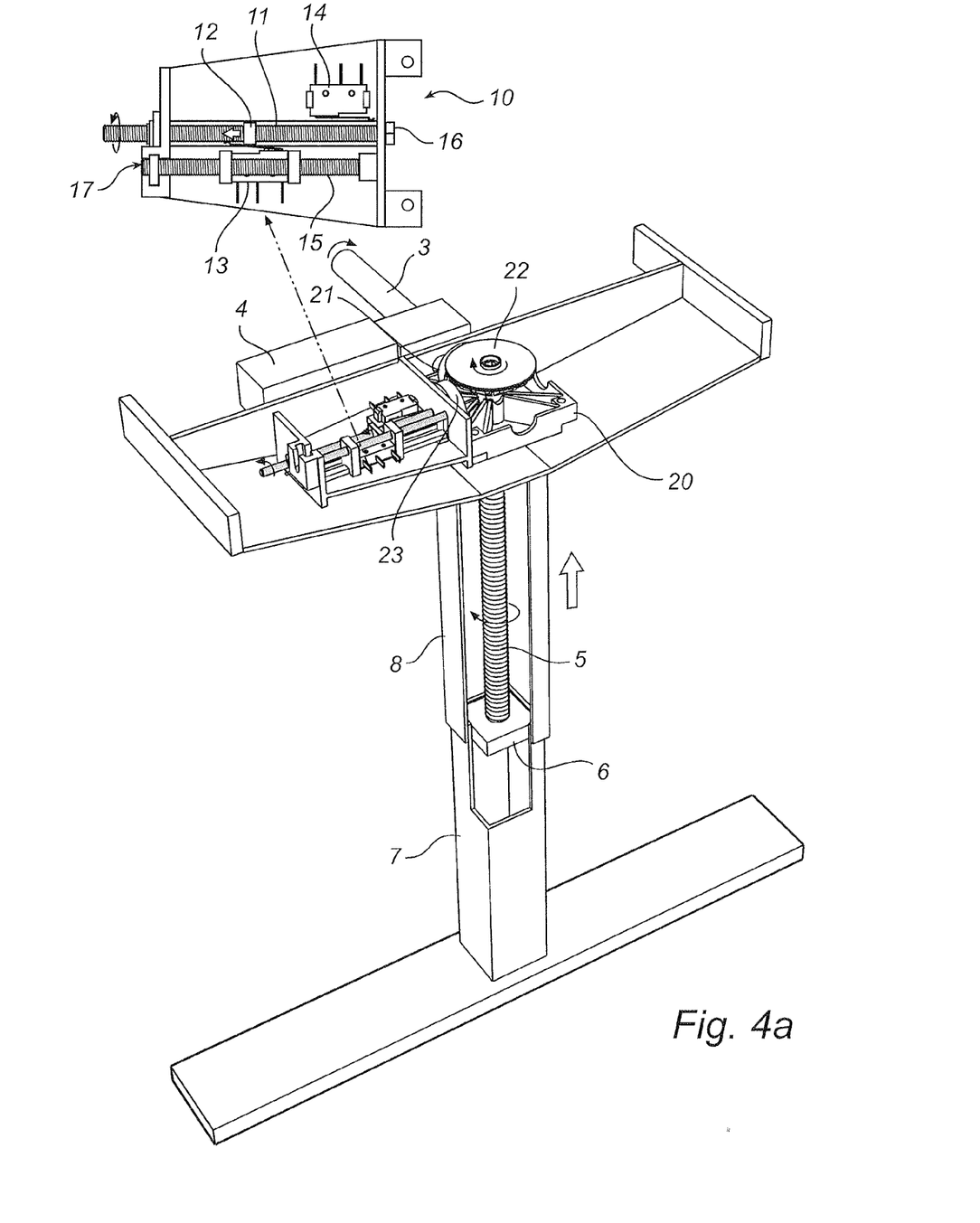
FIG. 4a is a schematic perspective view of a linear actuator according to the invention, with movement of expansion.
Figure 4B:
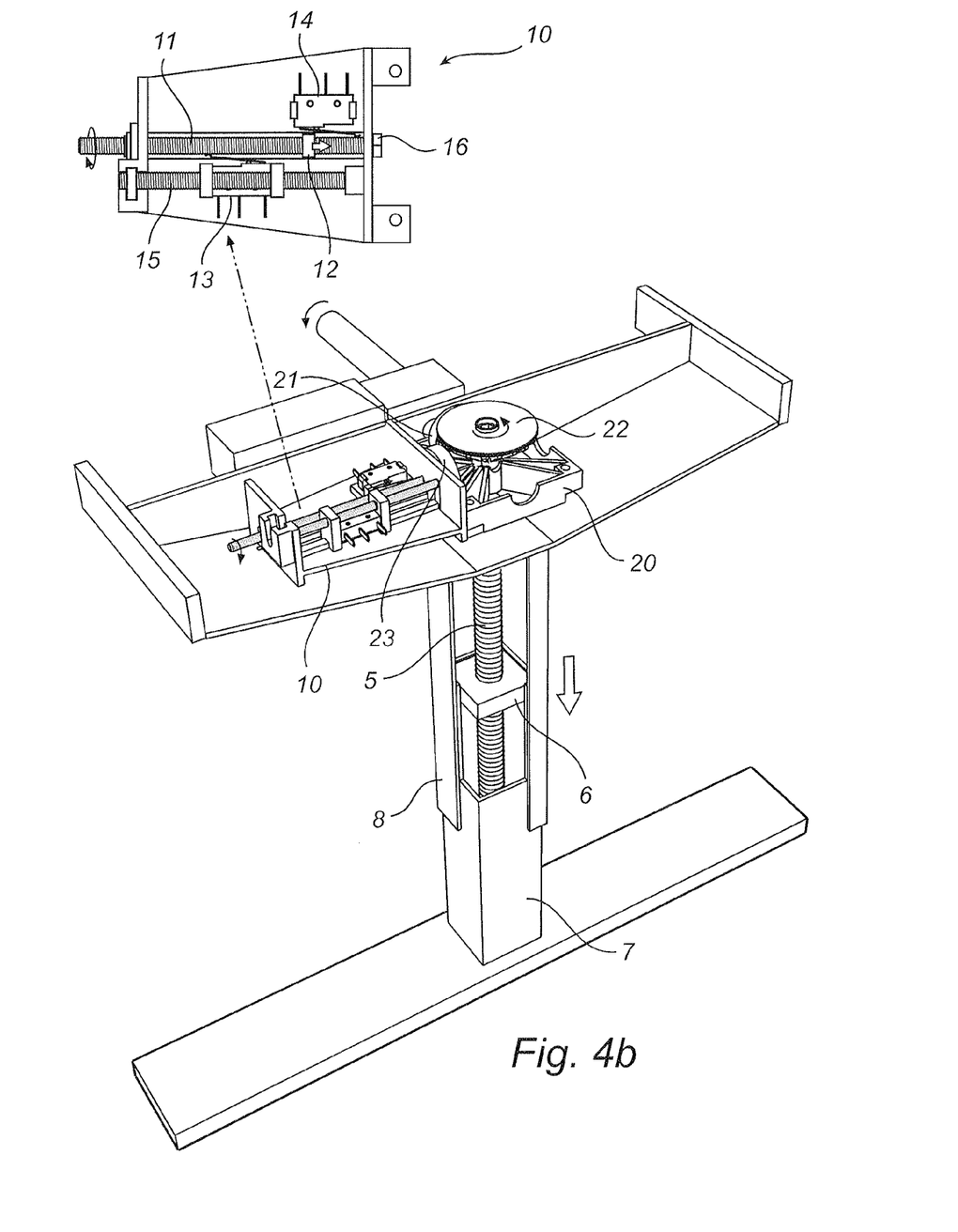
FIG. 4b is a schematic perspective view of a linear actuator according to the invention, with movement of contraction.
Figure 4C:
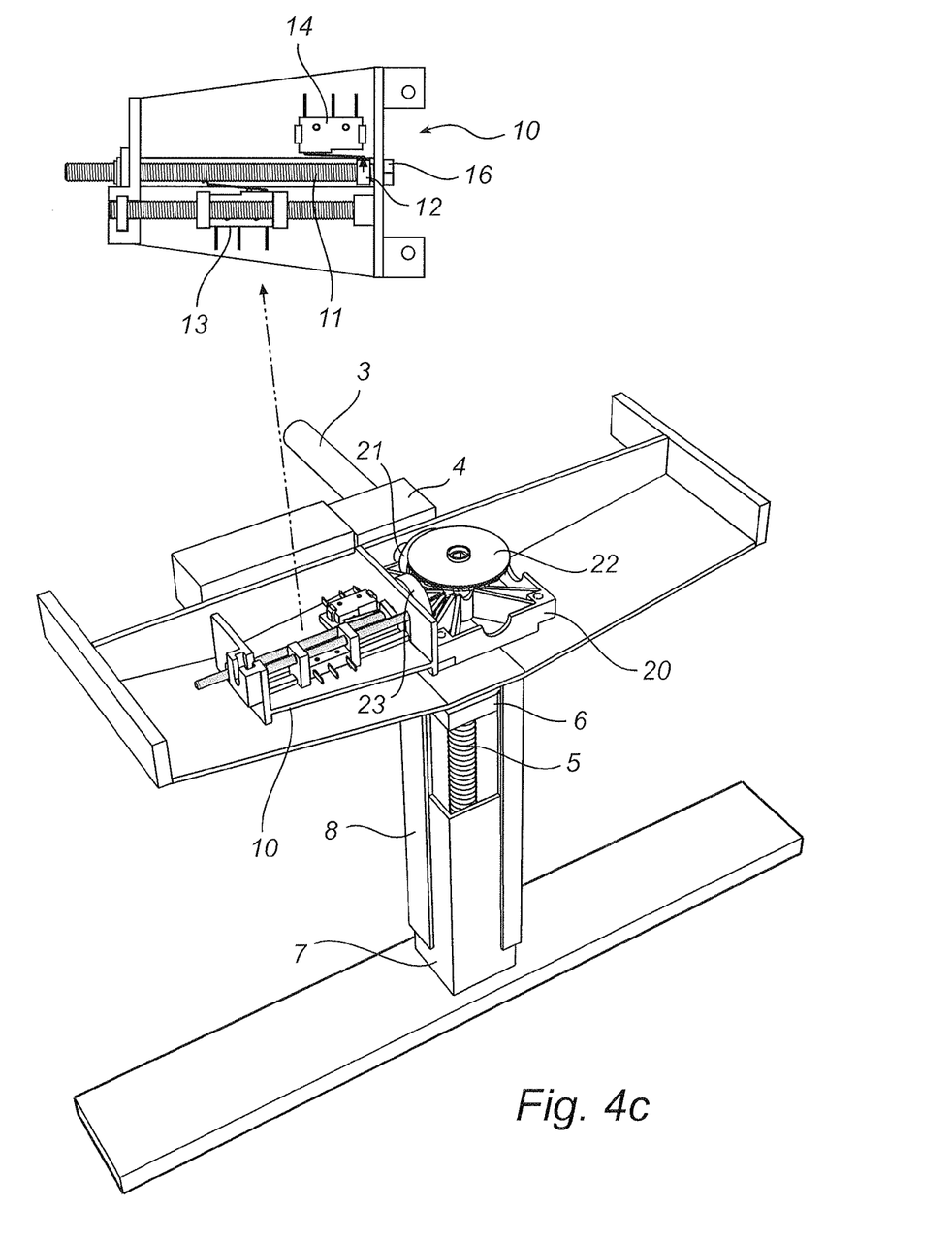
FIG. 4c is a schematic perspective view of a linear actuator according to the invention, in a minimum height position.

As described in FIGS. 3 and 4, the end stop nut 12 in the end stop detection unit 10 is a square shaped nut arranged rotationally prevented onto the end stop detection shaft 11. One side of the square shaped nut 12 lies against a plane surface below the end stop detection shaft 11 such that rotation of the nut 12 is prevented. The end stop detection shaft 11 is threaded, and the end stop nut 12 is provided with corresponding inner threads. Since the nut 12 is rotationally prevented, it moves along a longitudinal direction of the end stop detection shaft 11 when the shaft 11 rotates.

The end stop detection unit 10 further comprises a first 13 and a second 14 disconnecting switch, provided as micro switches. The disconnecting switches 13, 14 are arranged to stop the telescopic movement of the linear actuator 1 when reaching one out of two set end positions. The two end positions represent set maximum and minimum heights for the linear actuator 1. This prevents the telescopic movement to reach a physical limit of the extension or contraction of the linear actuator, which might damage the actuator 1. The end stop nut 12 reflects the position of the spindle nut 6 along the spindle 5. The end stop nut 12 is arranged to activate a disconnecting switch when the spindle nut 6 reaches an end position along the spindle 5.

The position of the first disconnecting switch 13 along the end stop detection shaft 11 represents the end position for set maximum height of the linear actuator 1. When the drive shaft 3 is rotated by the motor 4 for extension of the linear actuator 1, as described in FIG. 4a, the spindle 5 is rotated correspondingly via the first side gear 21 and the crown gear 22. This causes the spindle 5 to move relative to the spindle nut 6 such that a telescopic movement between the inner tube 7 and the outer tube 8 takes place. At the same time, the end stop detection shaft 11 is rotated via the second side gear 23 in such way that the end stop nut 12 moves along the shaft 11 towards the first disconnecting switch 13. When the set maximum height is reached, the end stop nut 12 activates the first disconnecting switch 13 which sends a stop signal to stop the rotation of the drive shaft 3.

The first disconnecting switch 13 is arranged rotationally prevented onto a switch positioning shaft 15. The first disconnecting switch 13 may be moved along the switch positioning shaft 15 by rotating the shaft 15. In that way, the end position for the set maximum height of the linear actuator 1 may be changed. The switch positioning shaft 15 is in one end provided with a notch 17 for a screw driver or the like, with which the switch positioning shaft 15 may be rotated to change the position of the first disconnecting switch and consequently the set maximum height for the telescopic movement of the tubes 7, 8.

The position of the second disconnecting switch 14 along the end stop detection shaft 11 represents the end position for minimum height of the linear actuator 1. The second disconnecting switch 14 is fixedly mounted in the end stop detection unit 10 next to the end stop detection shaft 11. When the spindle 5 is rotated for contraction of the linear actuator 1, as described in FIG. 4b, the end stop nut 12 moves along the end stop detection shaft 11 towards the second disconnecting switch 14 when the drive shaft 3 rotates the transmission gears 21, 22, 23. When the spindle nut 6 is in the set end position for minimum height, as shown in FIG. 4c, the end stop nut 12 activates the second disconnecting switch 14 which sends a stop signal to stop the rotation of the drive shaft 3.

The stop signals from the first and second disconnecting switches 13, 14, are sent to the control unit 9 (see FIG. 1) that uses the stop signals to control the motor 4.

Here, the end position for minimum height is set during manufacturing of the linear actuator 1, when the transmission 2 is mounted onto the spindle and the end stop detection unit 10 is connected to the transmission 2. However, there is a possibility to provide the second disconnecting switch 14 in a similar arrangement as the first disconnecting switch 13, such that also the position of the first disconnecting switch is adjustable, e.g. by being arranged rotationally prevented onto a switch positioning shaft.

The spindle 5 has a thread pitch that is at least 2 times the thread pitch of the end stop detection shaft 11, preferably at least 5 times, more preferably at least 10 times and most preferably at least 20 times the thread pitch of the end stop detection shaft 11. By this solution, the end stop detection shaft 11 can be made much shorter than the spindle 5 in order to save space in the linear actuator 1. For instance, the end stop detection shaft 11 may have a thread pitch of 0.8 mm/thread, and the spindle 5 a thread pitch of 20 mm/thread.

The transmission 2 may be provided with more than two side gears. There is room for four side gears inside the transmission housing 20, as can be seen in FIG. 2b. Additional side gears may be used for transmission of the rotational movement from the drive shaft 3 further to other legs with spindles, via other transmissions. For instance a table top or bed with four telescopically engaging legs in a rectangle may be driven by one motor via transmissions and drive shafts. These additional side gears will have a transmission ratio from a drive shaft of 1:1.

Another problem that is dealt with by this disclosure relates to performing a telescoping movement in two legs using only one driving means, e.g. motor. In such arrangements, there is one transmission for each leg. Each transmission is arranged to transmit movement of a drive shaft connected to the driving means to a spindle in each leg.

In such arrangements it is preferable to have the driving means 4 arranged in between the two legs 30, 31, as seen in FIG. 1. This way, the legs 30, 31 can be placed further out on the sides of a piece of furniture to which the legs belong, e.g. a table top. Further, there is less risk that the motor 4 stands in the way of a user; compared to if the motor 4 is arranged outside the two legs 30, 31, in the extension of a crossbar connecting the two legs. Although, if the driving means 4 is arranged in between the two legs 30, 31, two different types of transmissions need to be used since the first transmission 2 arranged in the first leg 30 has to transmit a clockwise movement and the second transmission 32 arranged in the second leg 31 has to transmit a counter-clockwise movement. I.e. the second transmission 32 need to have an inverted arrangement compared to the first transmission 2. By making a type of transmission that can be turned upside down, i.e. turned 180 degrees, only one type of transmission can be used for the first and the second transmission. Such an arrangement can be described in the following:

A linear actuator 1 comprising:
A first drive shaft and a second drive shaft 3;
A driving means 4 connected to a first end of the first drive shaft and to a first end of the second drive shaft 3;
A first transmission 2 connected to a second end of the first drive shaft;
A second transmission 32 connected to a second end of the second drive shaft 3;
a first spindle 5 connected to the first transmission 2,
the first drive shaft, the first transmission 2 and the first spindle 5 being connected in such a way that a rotational movement of the first drive shaft is transmitted to the first spindle 5 via the first transmission 2,
a second spindle connected to the second transmission 32, the second drive shaft 3, the second transmission 32 and the second spindle being connected in such a way that a rotational movement of the second drive shaft 3 is transmitted to the second spindle via the second transmission 32,
wherein the first transmission 2 and the second transmission 32 each has openings 24 for receiving a spindle, the openings being arranged at two opposite sides of the transmission.

I.e. the first transmission 2 has an opening 24 arranged for receiving a spindle 5 at a first of its sides and another opening 24 arranged for receiving a spindle at a second of its sides, wherein the first and the second side are opposite sides of the first transmission 2. See FIGS. 2*a*-2*c*. Similarly, the second transmission 32 has an opening 24 arranged for receiving a spindle at a first of its sides and another opening 24 arranged for receiving a spindle at a second of its sides, wherein the first and the second side are opposite sides of the second transmission 32.

The first drive shaft and the second drive shaft 3 may be provided as only one drive shaft.

By the transmissions 2, 32 having openings 24 for receiving a spindle, the openings being arranged at two opposite sides of the transmission, a spindle could enter the transmission from both openings. Thereby, a transmission could be used even if it is turned upside down.

Further, the second transmission 32 is arranged upside down compared to first second transmission 2. Further, as shown in FIG. 2, the openings 24 of each of the transmissions 2, 32 may be arranged as a common through hole 24 for receiving a spindle, for each of the transmissions.

An arrangement of a transmission that could be used for both the first and the second transmission, as described above, i.e. that could be used both in a normal position and turned upside down, could be described as follows:

A transmission 2 for use in a linear actuator 1, the transmission 2 being arranged for transmitting a rotational movement from a drive shaft 3 to a spindle 5, the transmission 2 comprising:
a first gear wheel 22, for example a crown gear, provided with openings 24 for receiving a spindle 5, the openings being arranged at opposite sides of the first gear wheel 22, and a second gear wheel 21, for example a side gear, for receiving a drive shaft 3, wherein the first gear wheel 22 engages the second gear wheel 21.

Since the first gear wheel 22 engages the second gear wheel 21 and the first gear wheel 22 is arranged to receive a spindle 5 and the second gear wheel 21 is arranged to receive a drive shaft 3, a rotational movement of a drive shaft 3 inserted in the second gear wheel 21 can be transferred into a rotational movement of a spindle 5 inserted into the first gear wheel 22. Also, since the first gear wheel 22 is provided with openings 24 for receiving a spindle 5, the openings being arranged at opposite sides of the first gear wheel 22, the whole transmission 2 could be turned upside down and anyhow be used to transfer a rotational movement in a similar way, but in an opposite direction.

The openings for receiving a spindle 5 are preferably arranged coaxially with a rotational axis of the first gear wheel 22. In a special case shown in FIG. 2, the first gear wheel 22 may have a through hole 24 for receiving a spindle 5. The through hole may be arranged coaxially with the rotational axis of the first gear wheel 22.

In the drawings and specification, there have been disclosed preferred embodiments and examples of the invention and, although specific terms are employed, they are used in a generic and descriptive sense only and not for the purpose of limitation, the scope of the invention being set forth in the following claims.

The invention claimed is:

1. A table frame having adjustable height, comprising a linear actuator, comprising: a drive shaft; a transmission connected to the drive shaft; a spindle connected to the transmission, the drive shaft, the transmission and the spindle being connected in such a way that a rotational movement of the drive shaft is transmitted to the spindle via the transmission, a spindle nut arranged rotationally prevented onto the spindle such that the spindle nut moves along the spindle when the spindle is rotated, an end stop detection unit for detecting that the spindle nut reaches an end position on the spindle, wherein the end stop detection unit comprises an end stop detection shaft connected to the transmission in such a way that a rotational movement of the spindle is transmitted to the end stop detection shaft such that a rotational movement of the spindle is reflected by a rotational movement of the end stop detection shaft, wherein the spindle has a substantially vertical extension and the drive shaft has a substantially horizontal extension, and wherein the end stop detection shaft lies in substantially the same horizontal plane as the drive shaft, wherein the end stop detection unit further comprises two disconnecting switches arranged at different positions along the end stop detection shaft, each position representing an end position for the spindle nut along the spindle, and wherein at least a first of the disconnecting switches is movably arranged along the end stop detection shaft.

2. The table frame having adjustable height according to claim 1, wherein the end stop detection unit further comprises an end stop nut arranged rotationally prevented onto the end stop detection shaft such that the end stop nut moves along the end stop detection shaft when the end stop detection shaft is rotated.

3. The table frame having adjustable height according to claim 1, wherein the first disconnecting switch is arranged rotationally prevented onto a switch positioning shaft such that the first disconnecting switch moves along the switch positioning shaft when the switch positioning shaft is rotated.

4. The table frame having adjustable height according to claim 3, wherein the switch positioning shaft has a notch in one end for changing the position of the first disconnecting switch.

5. The table frame having adjustable height according to claim 1, wherein at least a second of the disconnecting switches is stationary arranged at a fixed position along the end stop detection shaft.

6. The table frame having adjustable height according to claim 1, wherein the transmission comprises a first gearwheel for receiving the drive shaft, a second gear wheel for receiving the end stop detection shaft and a third gear wheel for receiving the spindle, and wherein the first gear wheel and the second gear wheel each engages the third gear wheel.

7. The table frame having adjustable height according to claim 6, wherein the first gear wheel and the second gear wheel each has a substantially horizontal rotational axis and the third gear wheel has a substantially vertical rotational axis.

8. The table frame having adjustable height according to claim 6, wherein the first gear wheel and the second gear wheel each engages the third gear wheel in such a manner that if the third gear wheel is rotated one revolution, the first gear wheel and the second gear wheel each is rotated two revolutions.

9. The table frame having adjustable height according to claim 1, wherein the spindle is threaded and the end stop detection shaft is threaded.

10. The table frame having adjustable height according to claim 9, wherein the spindle has a thread pitch that is at least 2 times the thread pitch of the end stop detection shaft, preferably at least 5 times, more preferably at least 10 times and most preferably at least 20 times the thread pitch of the end stop detection shaft.

\* \* \* \* \*